__ United States Patent [19]

Reinecke

[11] Patent Number: 4,790,606
[45] Date of Patent: Dec. 13, 1988

[54] APPARATUS FOR THE MEASUREMENT AND/OR REGULATION OF A BRAKING FORCE AND/OR OF A BRAKING TORQUE

[75] Inventor: Erich Reinecke, Burgdorf, Fed. Rep. of Germany

[73] Assignee: WABCO Westinghouse Fahrzeugbremsen GmbH, Hannover, Fed. Rep. of Germany

[21] Appl. No.: 89,186

[22] Filed: Aug. 25, 1987

Related U.S. Application Data

[63] Continuation-in-part of Ser. No. 821,628, Jan. 22, 1986, abandoned.

[30] Foreign Application Priority Data

Jan. 23, 1985 [DE] Fed. Rep. of Germany ....... 3502050

[51] Int. Cl.[4] .......................... B60T 8/00; G01L 1/00; G01L 3/16; G05D 15/00
[52] U.S. Cl. ................................. 303/103; 73/862.12; 188/1.11; 188/181 T; 188/195; 303/20; 303/100; 303/104; 303/112; 340/52 R; 340/52 A
[58] Field of Search ............... 303/100, 103, 104, 112, 303/96, 91, 92, 20; 340/52 B, 52 C, 52 A, 52 R; 73/862.12, 862.13; 374/46, 48, 153; 188/181 T, 1.11, 195

[56] References Cited

U.S. PATENT DOCUMENTS

| | | | |
|---|---|---|---|
| 3,887,040 | 6/1975 | Simon et al. | 340/52 A X |
| 3,958,445 | 5/1976 | Howard et al. | 340/52 A X |
| 3,975,706 | 8/1976 | Kato | 340/52 A |
| 4,477,124 | 10/1984 | Watanabe | 303/100 |
| 4,484,280 | 11/1984 | Brugger et al. | 303/100 X |
| 4,591,213 | 5/1986 | Rapoport | 303/92 X |

FOREIGN PATENT DOCUMENTS

1603741 11/1981 United Kingdom ............... 188/1.11

Primary Examiner—Douglas C. Butler
Attorney, Agent, or Firm—J. O. Ray, Jr.

[57] ABSTRACT

An apparatus which measures and regulates the braking torque of a brake unit in long-term operational use. The brake unit includes both a brakable element and the braking device. An output signal from at least one temperature-dependent measuring element, located on or in one of the brakable elements and the braking device, is supplied to an evaluation apparatus. The evaluation apparatus determines, from the current value of the output signal of the temperature-measuring element, a present braking torque, and adjusts such torque when desirable.

29 Claims, 1 Drawing Sheet

APPARATUS FOR THE MEASUREMENT AND/OR REGULATION OF A BRAKING FORCE AND/OR OF A BRAKING TORQUE

This is a continuation-in-part of my earlier filed and co-pending patent application Ser. No. 821,628, filed Jan. 22, 1986, and now abandoned.

BACKGROUND OF THE INVENTION

The present invention relates in general to braking and, more particularly, the invention relates to an apparatus for the measurement and/or regulation of a braking force and/or of a braking torque, which is transferred by a braking apparatus to a brakable element, in which the braking apparatus and the brakable element form a brake unit.

The problem of measuring and/or of regulating a braking force and/or a braking torque, comes up wherever it is necessary to retard components which are moving in relation to one another with the use of a brake apparatus. If the relative motion is translational, such as, in the movement of a machine sled on its bed, then the braking force is the measurement and/or regulatory characteristic. If the relative movement takes place along a curved path, such as, in the wheel brakes of motor vehicles with a constant radius of curvature, or cable drums; and with a changing radius of curvature, such as, on a carrousel, e.g. on a figure-eight railway, then the braking force can be tangential to the track and/or the product of the braking force and the radius of curvature, the braking torque, the measurement and/or control characteristic. Since, in the measurement and/or regulation of braking torque, the radius of curvature of the path is usually specified, the measurement and/or regulation of the braking torque also measures and/or regulates the braking force. But, since "braking force", on the other hand, is understood in important technical sectors as the deceleration force exerted on an entire unit, for example, a vehicle, the term "braking torque" will be used as a comprehensive designation for the concepts and particular situations described above.

An apparatus of the type described above is known in the art from I Mech E Conference Publications 1983-2: "Braking of Road Vehicles", specifically Paper C 22/83: "The development and proving of an individual wheel brake torque measurement system (IWBTM) for commercial vehicles", published by MEP Mechanical Engineering Publications Limited for the Institution of Mechanical Engineers, London. In this prior art, the deformations of a beam (axle body) of a wheel brake, serving as the brake unit of a vehicle under the influence of the braking torque, are monitored by means of strain gauges, and the output signal supplied by the strain gauges is measured as a characteristic for the value of the braking torque. This prior art has the disadvantage (see Column 2, Paragraph 2, of the cited publication) that it can only be used for research and development and troubleshooting purposes.

SUMMARY OF THE INVENTION

The present invention teaches an apparatus which performs at least one of measuring and regulating the braking force produced by one of at least two brake units in which the braking forces are transmitted to a brakable element for deceleration of such brakable element. The brake unit of the apparatus includes both a brakable element and a braking device.

The apparatus further includes a deceleration sensor which is mounted on the brakable element to provide an output signal value that is representative of a measured deceleration value of such brakable element. At least one mass sensor is mounted on the brakable element to provide an output signal value that is representative of a measured mass value of such brakable element. At least one temperature-dependent measuring element is mounted on each brake unit to provide an output signal value that is representative of a measured temperature value of such brake unit on which it is mounted. An evaluation means is connected to receive the output signals of each of the deceleration sensor and the mass sensor and the temperature-dependent elements. The evaluation means has stored therein the parameters for each brake unit to determine the temperature-development of each such brake unit during its activation. The evaluation means is designed so that at least during an activation of such brake units it determines the changes of temperature signals of such brake units as they occur over a time interval. The evaluation means being further designed so that it determines the medium deceleration value in such time interval, and the evaluation means being further designed such that from the changes of temperature signals of the brake units and from the output signal value of the mass sensor and from the medium deceleration value it generates and transmits an output signal value representative of a medium braking force produced by the one brake unit during the time interval.

OBJECTS OF THE INVENTION

It is, therefore, one of the objects of the present invention to provide, by relatively simple means, an apparatus which can be used for the measurement and/or regulation of the braking force produced by one of at least two brake units in which the braking forces are transmitted to a brakable element for deceleration of such brakable element.

Another object of the present invention is to provide an apparatus in which distortions, as the result of the measurement and/or regulation of such braking forces which may be caused by deformations of the beam resulting from dynamic influences, which influences may, for example, be an uneven roadway, are prevented.

The above and various other objects and advantages of the present invention will become more readily apparent to those persons skilled in the braking art, from the following more detailed description, when such description is taken in conjunction with the single drawing FIGURE and the appended claims.

BRIEF DESCRIPTION OF THE INVENTION

Simply stated, the present invention is predicated on the assumption that there is a natural relationship between the braking torque transmitted from a brake apparatus to a brakable element, and the temperature which thereby occurs on or in the braking apparatus and/or the brakable element. The invention uses this relationship for the measurement and/or regulation of the braking torque.

Relationships useful in the apparatus of the present invention are as follows:

If a brakable element with a mass M is decelerated with a deceleration d, then it is subjected to a braking force BF which has the value derived from the equation:

$$BF = M \cdot d \tag{1}$$

Now assuming that the brakable element has a plurality of braking units, for instance 6, which produce individual braking forces $bf_1$ through $bf_6$, then BF is the sum of these individual braking forces represented by the equation:

$$BF = bf_1 + bf_2 + bf_3 + bf_4 + bf_5 + bf_6 \tag{2}$$

or, after a brake activation has lasted for a time interval t, the equation:

$$\overline{BF} = \overline{bf_1} + \overline{bf_2} + \overline{bf_3} + \ldots + \overline{bf_6} \tag{3}$$

is representative for the medium forces applied in this time interval.

The speed of the brakable element as well as of the brake units having dropped from $V_1$ to $V_2$ in this time interval t, the heat Q generated by a brake unit can be derived from the equation:

$$Q = \overline{bf} \cdot \tfrac{1}{2} \cdot (V_1 - V_2) \cdot t \cdot A \tag{4}$$

where A is the mechanical heat equivalent.

This heat Q is absorbed by the mass m of the brake unit according to the relationship:

$$Q = m \cdot c \cdot d\text{temp} \tag{5}$$

wherein c is the practical thermal capacity of the brake unit and dtemp is its temperature increase in the time interval t.

The aforementioned practical thermal capacity is a specific value for the brake unit resulting from the properties of its construction materials and its cooling condition. Generally, c has to be determined experimentally.

From the above equations (4) and (5) follows:

$$\overline{bf} = \frac{2 \cdot m \cdot c \cdot d\text{temp}}{(V_1 - V_2) \cdot t \cdot A} \tag{6}$$

It is recalled (see preamble of equation (3)) that the brakable element and all brake units slow down identically. Therefore, from equations (4) and (6) it follows that:

$$\overline{BF} = \frac{2 \cdot m_1 \cdot c_1 \cdot d\text{temp}_1}{(v_1 - v_2) \cdot t \cdot A} + \frac{2 \cdot m_2 \cdot c_2 \cdot d\text{temp}_2}{(v_1 - v_2) \cdot t \cdot A} + \ldots + \frac{2 \cdot m_6 \cdot c_6 \cdot d\text{temp}_6}{(v_1 - v_2) \cdot t \cdot A} \tag{7}$$

The relative braking force share S of one brake unit, for instance of brake unit 2, can be represented by the equation:

$$S_2 = \frac{\overline{bf_2}}{\overline{BF}} \tag{8}$$

or, with equation (7)

$$S_2 = \frac{\frac{2 \cdot m_2 \cdot c_2 \cdot d\text{temp}_2}{(v_1 - v_2) \cdot t \cdot A}}{\frac{2 \cdot m_1 \cdot c_1 \cdot d\text{temp}_1}{(v_1 - v_2) \cdot t \cdot A} + \frac{2 \cdot m_2 \cdot c_2 \cdot d\text{temp}_2}{(v_1 - v_2) \cdot t \cdot A} + \ldots + \frac{2 \cdot m_6 \cdot c_6 \cdot d\text{temp}_6}{(v_1 - v_2) \cdot t \cdot A}} \tag{9}$$

or, simplified as $$S_2 = \frac{m_2 \cdot c_2 \cdot d\text{temp}_2}{m_1 \cdot c_1 \cdot d\text{temp}_1 + m_2 \cdot c_2 \cdot d\text{temp}_2 + \ldots + m_6 \cdot c_6 \cdot d\text{temp}_6} \tag{10}$$

From equations (10) and (1), it follows that the absolute medium braking force of one brake unit, for instance unit 2, can be represented by the equation:

$$\overline{bf_2} = \frac{m_2 \cdot c_2 \cdot d\text{temp}_2}{m_1 \cdot c_1 \cdot d\text{temp}_1 + \ldots + m_6 \cdot c_6 \cdot d\text{temp}_6} \cdot M \cdot d \tag{11}$$

Although the invention has been illustrated in the drawings as it applies to a motor vehicle, the principles of the invention are applicable in any type of braking unit which converts kinetic energy into thermal energy. Examples of such braking units at least include eddy current brakes, and friction brakes with at least one brake lining support including at least one brake lining. In the latter case, it does not matter how the normal force (brake application force) for the achievement of the friction force is achieved. It can be done by means of brake application devices designed as hydraulic or pneumatic cylinders; or as operating magnets whereby, as known, mechanical transmission elements, such as, cams, levers, shafts etc. can be located between the application apparatus and the brake apparatus.

Furthermore, the temperature monitoring can be done in all appropriate known ways on or in the braking apparatus and/or on or in the brakable element. The temperature-dependent measurement element can be designed as a temperature-dependent gas pressure sensor (thermo-gauge), which supplies output signals as a function of gas pressure changes; in which case, the evaluation apparatus must be appropriately sensitive to gas pressure. The temperature-dependent measurement element can also be designed as a temperature sensor which emits electrical output signals; in which case, the evaluation apparatus must be designed to work electrically/electronically. The output signals can be fed to the evaluation apparatus in the latter case, via lines, or can be sent by wireless means. The latter possibility is particularly advantageous if the brake apparatus and/or the brakable element, and thus the temperature sensor, cannot be located in a fixed position relative to the evaluation apparatus, and conductors with slip contacts, such as those which can be advantageous when the temperature sensor is located in a brakable element designed as a rotating brake disc or brake drum, cannot be used.

The temperature-dependent measurement element can be installed in the monitored component or can be embedded in its material.

In the case of a friction brake, the temperature dependent measurement, specifically if it is designed as a temperature sensor, can be located in the brake lining support and/or in the brake lining, so that its point closest to the brakable element comes into contact with the brakable element when the maximum allowable brake lining wear occurs, and thereby closes an electrical indicator and/or warning circuit. In this manner, an apparatus for the measurement and/or regulation of a braking torque can advantageously be combined with a warning system for the wear of the brake lining.

There can also be several temperature-dependent measurements on each brake apparatus and or on each brakable element. This can be of particular importance if the brake unit is a friction brake with several brake lining supports, as is generally the case in wheel brakes of vehicles.

When the present invention is used to regulate braking torques, a comparison apparatus is necessary, which compares the output signal emitted by the evaluation apparatus with at least one command value, and supplies an output signal corresponding to the result of the comparison, which is fed to a signal-processing apparatus and/or to a memory.

The above-mentioned evaluation apparatus can be combined with the temperature-dependent measurement element, or it can be designed as the input stage of the comparison apparatus.

The signal-processing apparatus can be designed as a braking torque control apparatus, which controls the braking torque according to the output signal of the comparison apparatus, and/or as a warning system which can emit optical or acoustical warning signals in a known manner. The braking torque control apparatus is designed, as a rule, so that it controls the feed of energy to the brake application apparatus as a function of the strength of the output signal fed to it from the comparison apparatus, and thus the brake application force. In the present invention, the braking torque control apparatus can be designed, for example, as an electrically-controlled pressure regulation valve or an electrically-controlled magnetic current regulator.

The command value for the comparison apparatus can be a value corresponding to the maximum allowable temperature on the brake unit. In this case, the braking torque control apparatus can control the braking torque so that the maximum allowable temperature on the brake units is not exceeded. Otherwise, or in addition, the warning system can go into operation when the above-mentioned maximum allowable temperature occurs.

If there are at least two brake units (e.g. two wheel brakes of a motor vehicle brake system), each of which has at least its own temperature-dependent measurement element with the corresponding evaluation apparatus and each of which also has its own braking torque control apparatus, then the comparison apparatus can be designed so that it compares the output signals coming from the evaluation devices with one another and selects the one corresponding to the lower temperature as the command value. In this case, the braking torque control apparatus corresponding to the brake unit with the higher temperature, can reduce the braking torque of this brake unit so that essentially the same temperature prevails on all the brake units. At the same time, however, the braking torque control apparatus, corresponding to the brake unit with the lower temperature, can increase the braking torque of this brake unit so that both brake units essentially take on the same temperature, but one which, in this case, is higher than the original lower temperature. In this manner, for example, the wheel brakes can be regulated on both sides of a vehicle axle to a uniform braking torque output. Pulling of the vehicle to one side is thereby substantially prevented, and more uniform wear of the brake lining is achieved.

In the case described above, groups of brake units can also be formed, whereby there is one braking torque control apparatus corresponding to each group, and whereby the output signals of the temperature-dependent measurement elements or of the evaluation devices of each brake unit of the group are averaged in the evaluation devices or in the comparison apparatus, and the average of the comparison apparaus is used as the command value. In this manner, e.g. in a multi-axle aggregate of a truck, just as described above for individual brake units, the wheel brakes on both sides of the vehicle, combined into groups, can be regulated to the same temperature of the brake units by controlling the braking torques. The above-mentioned combination of brake units, into groups has the advantage that the numbers of the control channels or control circuits of the comparison apparatus and of the braking torque control devices are limited.

The apparatus, described above, can also have a memory. This memory can store a family of characteristic curves of the braking torque and/or the values which characterize the braking torque, e.g. the braking pressure of the current of the operating magnets, as a function of the temperature of the brake unit and/or the values which characterize its temperature. In this case, the comparison apparatus can be designed so that it extracts a value from the memory as the command value, which corresponds to the temperature corresponding to the current braking torque. Thereby, a constant monitoring of the brake unit or brake units can be achieved, and if deviations from the characteristic data occur, there can be an activation of the warning system and/or an appropriate regulation of the braking torque, specifically in the sense of the prevention of any temperatures exceeding the maximum allowable temperature.

In the memory, the output signals from the comparison apparatus, obtained on the occasion of a brake application, can be buffered and extracted, on the occasion of one or more subsequent brake applications, from the comparison apparatus as command values. In this manner, for example, it is possible to perform a regulation of the braking torque as a function of the temperature, even in cases of temperature measurement affected by inertia, from the aspects described above.

The memory and/or the evaluation apparatus can also form an average value, as the command value, from the output signals of the comparison apparatus from several previous brakings. Another possible method of taking into consideration any possible inertia in the temperature measurement is, rather than to continuously regulate the braking torque on the basis of the temperature, one can perform the braking torque regulation in stages, and to provide appropriate timing elements, for example, in the comparison apparatus.

An apparatus with the characteristics and capabilities described above can also work together with other devices for the regulation or control of the braking torques produced by one or more brake units.

Thus, as a rule, at least one activation apparatus for the setting of the braking torque is generally assigned to one or more brake units. Application devices of this type can be, for example, the service brake pedal or the emergency brake pedal of a vehicle brake system, or the brake switch or the brake regulator of a device to be retarded or a device with elements to be retarded (e.g. hoists). The desired adjustment of the braking torque with the activation apparatus can be superimposed on the braking torque regulation exercised by the apparatus described above.

Specifically in vehicle brake systems, moreover, there can be at least a second evaluation/comparison apparatus, possibly with one or more memories, which emits output signals as a function of specified vehicle characteristics to the braking torque control apparatus, and which are thereby superimposed on the arbitrary braking torque adjustment. Such vehicle characteristics can, for example, be the load status of the entire vehicle or of individual axles or groups of axles, the wheel slip, the brake delay, a retarder torque. The braking torque regulation exercised by this second evaluation/comparison apparatus must be superimposed on, adjusted to, or made secondary to the braking torque regulation exercised by the brake regulation apparatus mentioned above. The programs and logic circuits required for this purpose can be installed in the comparison apparatus and/or in the second evaluation/comparison apparatus and/or their memories.

Specifically, the braking torque control apparatus and/or the comparison apparatus can be designed so that in specified ranges of values of the output signal of the second evaluation/comparison apparatus, the braking torque regulation is disabled as a function of the temperature of the brake unit(s). In a presently preferred embodiment, the braking torque regulation, as a function of the temperature, can act in the partial braking range; while in the full braking range, it is disabled in favor of a load-controlled regulation of braking torque by the second evaluation/comparison apparatus. In this manner, the partial braking range can be used to harmonize the brake lining wear on different wheel brakes, specifically those of the same axle; while in the full braking range, the total load-controlled transmissible braking torque can be utilized.

In the case of brake unit(s) designed as friction brakes according to the definition given above, a braking torque regulation as a function of the brake lining wear, can be integrated or additionally provided in the apparatus mentioned above and/or, if any, in the second evaluation/comparison apparatus. For this purpose, there can be a distance sensor located on one or more brake lining supports of each brake unit or group of brake units, which, during each application of the brake, measures its distance from the brakable element, preferably its surface, and emits an output signal corresponding to this distance as a wear value signal and/or to the comparison apparatus and/or to the second evaluation/comparison apparatus, if any, and/or to its own evaluation/comparison apparatus, if any. The above-mentioned devices, if any, are then designed so that they emit output signals corresponding the wear value signal to the signal-processing apparatus and/or to the memory or to the braking torque control apparatus. In this manner, the braking torque can also be regulated as a function of the wear value signal, either immediately or after the buffer storage of the above-mentioned output signals from one or more subsequent brakings. At the same time, a value corresponding to the wear value signal, can be indicated in a wear indicator apparatus and/or a wear warning system can be activated when a maximum allowable wear value is reached.

In a presently preferred embodiment, the distance sensor and the temperature sensor can be combined in one unit.

The output signal supplied, as described above, by the measurement element which operates as a function of the temperature or by the corresponding evaluation apparatus can, in the case of a brake unit designed as a friction brake, also be used as the wear value signal for the wear indication and/or for the wear warning and/or for a wear equalization between at least two brake units or at least two brake linings of one brake unit. With a given design of the brake unit and a given position of the temperature-dependent measurement element relative to the engagement surface of the brake lining and the brakable element, there exists a fixed relationship between the thickness of the brake lining, the braking torque, and the brake lining temperature. At a given braking torque, there is a higher temperature on the more severely worn, i.e. thinner brake lining, than on the less severely worn, i.e. thicker brake lining. To use this relationship in the manner indicated above, a family of characteristic curves of the correspondence of the above-mentioned values or corresponding values must be stored in at least one of the above-mentioned memories and/or in an additional memory. By means of this family of characteristics, the signal-processing apparatus, specifically if it is designed as a warning system, and/or the comparison apparatus and/or the second evaluation/comparison apparatus and/or an additional comparison apparatus can form wear value signals as a function of the temperature. The warning system can emit a warning signal if the wear value signal corresponds to a maximum allowable wear value. The above-mentioned comparison device can simultaneously give output signals to the braking torque control device(s) on the basis of which the latter reduce the braking torque of the corresponding brake unit or group of brake units. This latter option can be applied to special advantage if, in one of the above-mentioned comparison devices, the temperature-dependent wear value signals of at least two brake units or groups of brake units are compared, and that of the braking torque control apparatus corresponding to the hotter brake unit or group of brake units is controlled in the sense of an equalization of the temperatures of the brake units or groups of brake units, and thereby in the sense of an equalization of the brake lining wear.

In the cases described immediately above, too, if the temperature measurement is affected by inertia, the braking torque regulation mentioned above can be executed after a buffering of the output signals of the comparison device on the occasion of one or more subsequent brake applications, or it can be done in stages.

All the above-mentioned measurement elements, sensors, memories, evaluation devices, comparison devices and evaluation/comparison devices can be designed in preferred embodiments electrically/electronically. They can also be combined with one another, in whole or in part, in preferred embodiments.

On the basis of the characteristics defined above, the invention can be used advantageously, but not exclusively, in a brake system of a vehicle or a combination of vehicles, particularly for commercial vehicles, all designated as "vehicle" below, with at least two wheel brakes or groups of wheel brakes operating as a brake unit, called "wheel brake(s)" below. Thereby the wheel brakes can be designed, for example, in a known manner, as friction brakes with at least one brake lining support exhibiting at least one brake lining. In presently preferred embodiments, the wheel brakes can be designed in a known manner as drum brakes or partial disc brakes, or as full wheel disc brakes.

The present invention will now be described with reference to the embodiment illustrated in the drawing.

Figure 1:
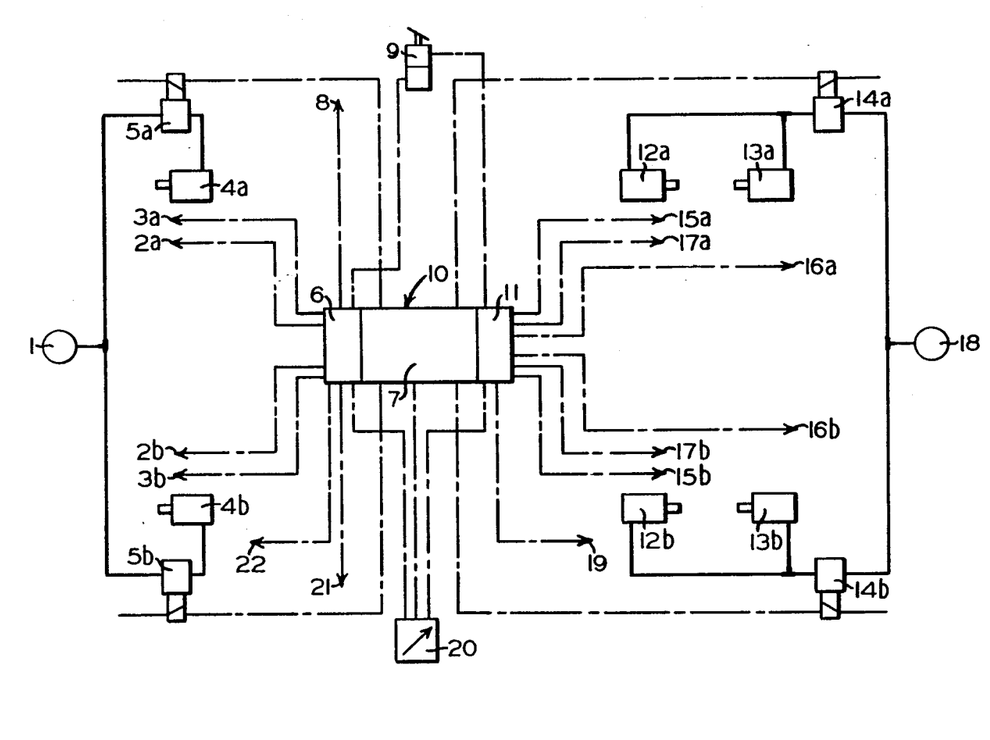
The single FIGURE is a schematic diagram of a brake system of a three-axle motor vehicle.

In the following explanation of the embodiment, the designation "a" always refers to the right side of the vehicle, and the designation "b" always refers to the left side of the vehicle. The vehicle, equipped with the illustrated brake system, exhibits a front axle, and two rear axles combined into a rear axle assembly. The brake units exhibited by the vehicle are designed as drum brakes, partial disc brakes, or full wheel disc brakes, in the manner of friction brakes, which are symbolized by 4a and 4b for the application devices for the front axle 12a and 12b for the application devices of the first rear axle, and 14a and 14b for the application devices for the second rear axle. The application devices can be designed as hydraulic or pneumatic cylinders or as operating magnets.

The energy supply for the brake application devices comes for the front axle from an energy source 1, and for the rear axle from an energy source 28. The energy sources, dependent on the design of the brake application devices, are designed as hydraulic or pneumatic reservoirs or electrical generators, which concept also includes electric batteries.

The energy feed lines between the energy source and brake application devices are indicated in the drawing by solid lines.

On the front axle, in the energy feed line of each brake application apparatus 4a and 4b, there is a braking torque control apparatus 5a and 5b. On the rear axle, in the energy feed line to the brake application devices on each side of the vehicle 12a and 13a and 12b and 13b, there is also a braking torque control apparatus 14a and 14b. The wheel brakes of the rear axle assembly are thereby combined into a group symbolized by the brake application devices 12a and 13a for the right side of the vehicle, and a group symbolized by the application devices 12b and 13b for the left side of the vehicle.

The braking torque control devices can be continuously controlled electrically, and make possible a release of energy to the brake application devices in infinitely adjustable stages between zero and the maximum value which is available from the appropriate energy source. The braking torque produced by each wheel brake is essentially proportional to the energy level fed from the corresponding application apparatus, except for response thresholds, hysteresis, and other customary characteristics of the above-mentioned type of brake. Changes of the above-mentioned energy level and of the braking torque therefore run essentially parallel.

As a result of the separate energy supply, the brake system illustrated has two circuits, with a front axle braking circuit and a rear axle braking circuit.

To control the braking torque control devices, there are a braking value transmitter 9, and an electronic regulation apparatus consisting of an electronic system 10 and sensors 2a and 2b, 3a and 3b, 8, 15a and 15b, 16a and 16b, 17a and 17b, 19, 21, 22 and an energy supply apparatus (not shown).

The dotted lines in the drawing represent the electrical connections between the above-mentioned electrical/electronic components of the brake system.

The electronic system 10 includes one or more evaluation devices 6 and 11, in which the output signals emitted by the sensors and by the brake value transmitter 9 are processed, and one or more comparison devices 7, plus one or more memories, which are not described in any greater detail.

The braking value transmitter 9 can be operated at will by the driver of the vehicle—possibly by means of a pedal—and supplies electrical output signals, which are a function of the force with which the pedal is pressed or the distance which the pedal is moved, which are fed to the evaluation apparatus 6 and 11 of the electronic system 10.

The sensors 3a and 3b, 15a and 15b, 16a and 16b are designed as electrical, temperature-dependent measurement elements, called "temperature sensors" below. They are always located in a brake lining support of a wheel brake in such a way that they measure the temperature of a brake lining connected with the brake lining support. The temperature sensors are thereby preferably located in the brake lining support so that they are embedded in the brake lining. This makes it possible to use wear value indicators as temperature sensors.

The temperature sensors 3a and 3b are always located on a brake lining support of the front axle wheel brakes, and the temperature sensors 15a and 15b are always located on a brake lining support of the wheel brakes of the first rear axle, and the temperature sensors 16a and 16b are always located on a brake lining support of the second rear axle. Each of the above-mentioned temperature sensors is coordinated in the evaluation apparatus 6 and 11 of the electronic system 10 with its own evaluation apparatus, the output signals of which are fed to the comparison apparatus 7. The evaluation devices corresponding to the temperature sensors 15a and 16a on the one hand, and 15b and 16b on the other hand, are designed so that they form an average value from the output signals of the corresponding temperature sensors, and from them, their own output signals to the comparison apparatus.

The sensors 2a and 2b are designed as wheel slip sensors for each side of the front axle, and the sensors 17a and 17b are designed as wheel slip sensors for each side of one rear axle. The sensor 8 senses the deceleration of the vehicle, and the sensor 21 senses a deceleration torque, while the sensors 22 and 19 are designed as axle load sensors of the front axle and rear axle, respectively. The signals from the above-mentioned sensors are also processed in the evaluation apparatus 6 and 11 into its own output signals, and fed, as such, to the comparison apparatus 7 of the electronic system 10. The electronic system 10 therefore contains, in addition to the memory or memories, the evaluation devices corresponding to the temperature sensors 3a and 3b, 15a, 16a, 15b, 16b, the comparison apparatus corresponding to the temperature-dependent output signals of the evaluation devices, and a second evaluation/comparison apparatus which processes the signals of the other above-mentioned sensors. The second evaluation/comparison apparatus also processes the signals from the brake value transmitter and is designed as a wear regulation device.

Each braking torque control apparatus, therefore, represents a signal-processing apparatus for the output signals emitted by the comparison apparatus 7.

The reference numeral 20 designates a combination instrument which, on one hand, is electrically connected with the evaluation devices corresponding to the temperature sensors 3a, 3b, 15a, 16a, 15b, 16b; and on the other hand, with the comparison apparatus 7. By means of its connection with the comparison apparatus 7, the combination instrument 20 serves as a warning system, and thus as another signal-processing apparatus. By means of its connection with the above-mentioned evaluation devices, the combination instrument 20 serves as an indicator apparatus.

When the brake system described above is activated, the driver, by means of the braking value transmitter 9 and the second evaluation/comparison apparatus of the electronic system 10—in connection with the wheel slip, retarder torque, axle load, and vehicle deceleration sensors—interact in a known manner as a braking torque regulating system with a load-controlled and anti-locking braking torque regulation. For this purpose, the second evaluation/comparison apparatus evaluates the signals obtained from the braking value transmitter 9 and the other above-mentioned sensors and, on the basis of the programs it has stored for each braking torque control apparatus 5a and 5b and 14a and 14b, evaluates an individual output signal, which is a function of these signals, according to the strength of which the appropriate braking torque control apparatus controls the energy feed of the corresponding wheel brake or group of wheel brakes.

The braking torque regulation, described above, is partly superimposed and partly replaced, in the manner described below, by a braking torque regulation which is a function of the temperature of the brake lining.

The comparison apparatus—possibly including the memories provided in the electronic system 10—is designed so that it compares the evaluation signals received from the evaluation devices corresponding to the temperature sensors with command values, and when deviations from the command value occur in a negative direction, emits output signals to the braking torque control devices directly or to the second evaluation/comparison apparatus, which effect an adjustment of the braking torque control apparatus in the sense of an elimination of the deviation.

As the command value, a maximum allowable temperature is stored in the comparison apparatus, on one hand, for each of the brake linings monitored by a temperature sensor. For the rear axle brake circuit, this maximum value relates to the above-mentioned average temperature. If this maximum allowable temperature is reached on a brake lining, the comparison apparatus puts the warning system of the combination instrument 20 in operation. The comparison apparatus can be designed so that it simultaneously adjusts the signal fed to the braking torque control apparatus in question in the sense of a reduction of the energy feed to the corresponding brake application apparatus, and thus in the sense of a braking torque reduction. This adjustment can also be made by axles. If this type of adjustment is provided, then it must be guaranteed by an appropriate configuration of the comparison apparatus or other components of the electronic system 10 that, there is no accidental reduction of the braking torque, such as, in a critical driving situation.

The comparison apparatus is also designed so that it compares the output signals delivered by the evaluation devices, corresponding to the front axle, with one another. If these output signals on both sides of the vehicle indicate different brake lining temperatures, and if the braking torque regulation which operates as a function of the wheel skid is not in a regulation phase just at that moment, then the comparsion apparatus uses the output signal indicating the lower brake lining temperature as the control value. The same goes for the average value formed for the rear axle brakes. The comparison apparatus is also designed so that it adjusts the braking torque control devices of the front axle and the rear axle, so that the braking torque on both sides of the vehicle are regulated so that, essentially, the same temperature occurs in the brake linings on both sides of the vehicles. The braking torque on the vehicle side with the originally lower brake lining temperature is therefore increased, and the temperature in the brake lining on the other side of the vehicle is decreased, so that the brake linings on both sides of the vehicle assume a temperature which lies between the originally higher and the originally lower temperature. With this simultaneous regulation of the braking torque on both sides of the vehicle, the total braking torque on the axle essentially remains the same.

In the case described above, it is also possible that only the braking torque on the vehicle side with the higher brake lining temperature can be reduced, so that the higher brake lining temperature drops to the value measured on the other side of the vehicle. Thus, the total braking torque of the axle would also decrease.

With the regulation of the braking torque on both sides of an axle to the same brake lining temperature as described above, except when the anti-locking brake system is in a regulation phase, an uneven braking torque production on both sides of a single axle, and therefore pulling an uneven brake wear, can be substantially prevented.

Since the measurement of the brake lining temperature and its changes takes place under the effect of inertia by means of the temperature sensor, the above-mentioned adjustments of the braking torque do not take place immediately. The output signals produced for this adjustment by the comparison apparatus are initially buffered and used to adjust the braking torque on the occasion of subsequent brake applications.

Another method of taking the inertia of the above-mentioned temperature measurement into account would be to feed the temperature-dependent output signals from the evaluation apparatus to the comparison apparatus not continuously, but as pulses, and to keep the output signal of the comparison apparatus constant between each two pulses. In this manner, the above-mentioned adjustment of the braking torque would take place in stages.

In a memory of the electronic system 10 for the wheel brakes of the front axle and the lateral groups of wheel brakes of the rear axle, a family of characteristics is stored correlating the brake lining temperatures (or an average of the brake lining temperatures of each side of the rear axle), brake lining thickness, and strength of the signal fed to the braking torque control apparatus by the electronic system 10.

From this family of characteristic curves, the comparison apparatus extracts, on the occasion of each brake activation or after a specified number of brake activations, for the signal fed to the braking torque control apparatus, the command value of the brake lining temperature; compares it with the actual temperature, and if unallowable deviations occur, activates the warning system of the combination instrument 20. In this manner, a continuous monitoring of proper operation (e.g. correct application) of the wheel brakes is guaranteed.

The evaluation apparatus, on account of this stored family of characteristics, is able to form an appropriate braking torque signal from the temperature-dependent output signals emitted by the temperature sensor, which are fed to the indicator apparatus of the combination instrument 20, and are indicated by the latter as the value of the braking torque just produced. The indicator apparatus can exhibit a separate braking torque indicator for each wheel brake or groups of wheel brakes, or it can exhibit only a single braking torque indicator which can be switched to the various wheel brakes or groups of wheel brakes. This indication, too, makes possible a constant monitoring of the function of the wheel brakes.

On the basis of the above-mentioned family of characteristics, the electronic system 10 forms, in an appropriately-designed portion, a wear value signal from the strength of the signal fed to the braking torque control apparatus and the indicated brake lining temperature, which wear value signal characterizes the thickness and thus the wear of the brake lining. To this extent, the temperature sensors are also wear value transmitters. The wear value signal is also used to activate the warning system located in the combination instrument 20. The combination instrument 20 can also exhibit one brake value indicator which can be switched to the various wheel brakes, or an individual indicator apparatus for the brake lining wear on each brake which convert the wear value signals into readings on a scale.

The indication of the braking torque described above, if there is a linear relationship between the brake lining temperature and the braking torque, can also be done by a direct evaluation of the temperature-dependent output signals of the temperature sensors into the indicator apparatus (e.g. in temperature indicators calibrated in units of braking torque).

A warning, when the maximum allowable brake lining wear occurs, can also be given, so that the temperature sensor, when this maximum allowable wear occurs, comes into contact with the brake drum or brake disc combined with the brakable element.

The brakable element must be an electrical conductor, and must be in the circuit of the warning system of the indicator instrument 20. As a result of the above-mentioned contact, the circuit is closed and the warning system is activated.

The temperature sensor can also simultaneously be designed as a distance sensor, which, during each application of the brake or after a specified number of brake applications, measures its distance from the brake drum or from the brake disc and thus the brake lining wear, and forms wear value signals from the distance measured, by means of which the warning system and/or the above-mentioned wear value indicator apparatus can be activated. The wear value signals from the wheel brakes on both sides of an axle can also be compared with one another in the electronic system 10, whereby the electronic system 10 can control the braking torque control apparatus on both sides of the vehicle in the sense of an equalization of the brake lining wear on both sides of the vehicle. It is apparent that comparison value transmitters, designed as distance sensors, can also be located, along with the temperature sensors, in the brake lining support or supports. The electronic system 10, especially the second evaluation/comparison apparatus contained therein, is finally designed so that it only evaluates the output signals emitted by the comparison apparatus concerning the braking torque adjustment; as long as the signals for the braking torque control devices—in connection with the axle load sensors, the retarder torque sensor, and the vehicle deceleration sensor—lie below a specified limit value, which, in the pressure case, is different from the front axle and rear axle. In this manner, it is guaranteed that the braking torque adjustment triggered by the brake lining temperatures takes place only in the range of partial brake applications, and not in critical braking situations.

The braking system in this embodiment can also be located in a vehicle trailer, specifically if the latter forms, with the tractor vehicle exhibiting the brake system according to the embodiment, a vehicle combination. In a manner which will be apparent to a specialist in the field, when the above-mentioned braking system is used in a trailer, the braking value transmitter 9 must be designed as a trailer brake valve controlled by the tractor vehicle.

All the above remarks also apply accordingly for a vehicle with a single-circuit braking system, especially as realized for a trailer.

It is apparent that the braking torque adjustment, as a function of the brake lining temperature described above, can also be realized without the presence of a control apparatus which operates as a function of other vehicle characteristics. In this case, the output signals of the comparison apparatus would be fed directly from the comparison apparatus to the braking torque control devices. In this case, too, all the other devices, such as, memories, priority logic circuits, etc., located in the present case in other parts of the electronic system 10, are located in the comparison apparatus.

As can now be seen from the above equations and detailed description of the invention, the apparatus provides a deceleration sensor mounted on the brakable element to provide an output signal value that is representative of a measured deceleration value (d in the equations) of the brakable element. At least one mass sensor is mounted on the brakable element to provide an output signal value that is representative of a measured mass value (M in the equations) of such brakable element. Also included is at least one temperature measuring element mounted on each brake unit to provide an output signal value that is representative of a measured temperature value (dtemp in the equations) of the brake unit on which it is mounted. The parameters for the temperature development of each brake unit, namely m and c in the equations, are stored in the evaluation means. Hence, all data are available for the evaluation means for determining $\overline{bf}_2$. It is obvious that the braking force of other or the other brake units can be determined analogously.

Now, in the example for which the invention is being described, the brakable element is mounted on a vehicle, the wheel brakes of which are the brake units. In a vehicle, usually all wheel brakes of a given axle are of identical design: This means that for a vehicle the brake unit characteristics can be considered per axle and do not have to be considered per brake unit, which simplifies equation (11), for instance for the vehicle shown in the drawing of present application to:

$$\overline{bf}_{4a} = \frac{m_4 \cdot c_4 \cdot dtemp_{4a}}{m_4 \cdot c_4 \cdot (dtemp_{4a} + dtemp_{4b}) + \ldots + m_{13} \cdot c_{13} \cdot (dtemp_{13a} + dtemp_{13b})} \cdot M \cdot d \quad (12)$$

and for the other wheel brakes analogously. In (12), the indices correlate with the numerals from the drawing.

If the medium brake torque $\overline{bt}$ of a brake unit of the rotary type is required, this can be determined by multiplying the results of equations (11) or (12), respectively, with the lever arm 1 on which $\overline{bf}$ acts, which arm is in the case of the vehicle the dynamic wheel radius $r_{dyn}$ (i.e. dynamic tire radius in case of wheel with tires):

$$\overline{bt} = (11) \cdot 1 \quad (13)$$

or $$\overline{bt} = (12) \cdot r_{dyn} \quad (14)$$

respectively.

In one embodiment of the invention, the shortest possible time interval is the cyclus time of the evaluation means. In view of the extremely short operation cycli of modern evaluation means, this embodiment delivers practically at any time the actual braking force produced by the brake unit. In other utilizations of the invention, it may be useful to vary the time interval. Particularly, it can be useful to operate with a shorter time interval at a lower absolute temperature level and with a longer time interval at a higher absolute temperature level.

Additionally, according to the present invention, the output signal of the evaluation means can be used as a command signal for another one of the brake units and, in this case, the comparison means is designed such that it generates an output signal when the output signal values of the evaluation means for two brake units differ by more than a predetermined value. In this manner, it becomes possible to observe two brake units for unacceptable operational deviations from each other. Such deviations occur when the output signals of the evaluation means for the two brake units differ by more than a predetermined value, the range of possible values including zero. If said difference occurs, the comparison means generates an output signal which is used to adjust the brake units (i.e. precisely their energization) for reducing the existing temperature differences to to the predetermined value or less. Hence, and in other words, this embodiment serves for observing and maintaining in predetermined relation, the brake forces produced by the brake units or, again in other words, the brake force distribution.

Through the provision of a signal-processing means and a memory storage means for receiving the output signal from the comparison means, it becomes possible to react immediately, in one case, to such signal from the comparison means or, in a second case, the signal from the comparison means can be buffered to allow reaction in subsequent brake applications.

To make use of equation (14), the evaluation means is equipped with a storage of a dynamic wheel radius and the evaluation means is designed such that by means of the dynamic wheel radius, it transforms the output signal representative of a medium braking force into an output signal representative of a medium braking torque.

When the brake apparatus is mounted on a vehicle, the mass sensor can be at least one axle load sensor for each vehicle axle, in which case the brake activation means is designed such that it automatically adjusts the distribution of the braking torques between the vehicle axles to the axle load distribution.

While both presently preferred and various alternative embodiments of the present invention have been described in detail, it should be obvious to those persons skilled in the braking art that other modifications and adaptations can be made without departing from the spirit and scope of the appended claims.

I claim:

1. An apparatus for performing at least one of measuring and regulating a braking force produced by at least one of at least two brake units, which braking force of each of said at least two brake units is transmitted to a brakable element for decelerating such brakable element, said apparatus comprising:
    (a) a deceleration sensor mounted on said brakable element to provide an output signal value that is representative of a measured deceleration value of said brakable element;
    (b) at least one mass sensor mounted on said brakable element to provide an output signal value that is representative of a measured mass value of said brakable element;
    (c) at least one temperature-dependent measuring element mounted on each brake unit to provide an output signal value that is representative of a measured temperature value of a brake unit on which said at least one temperature-dependent measuring element is mounted;
    (d) an evaluation means connected to receive said output signal values of said deceleration sensor and said at least one mass sensor and said at least one temperature-dependent element;
    (e) said evaluation means having parameters stored therein of each brake unit for determining a temperature-development of each brake unit during activation of each such brake unit;
    (f) said evaluation means having a capability of determining changes of temperature signal values of said brake units having occurred in a time interval at least during an activation of said brake units;
    (g) said evaluation means being capable of determining a medium deceleration value in said time interval; and
    (h) said evaluation means from said changes of said temperature signal values of said brake units and from said output signal value of said mass sensor and from said medium deceleration value generates and transmits an output signal value representative of a medium braking force produced by said at least one brake unit during said time interval.

2. An apparatus, according to claim 1, wherein said time interval is a cyclus time of said evaluation means.

3. An apparatus, according to claim 1, wherein said evaluation means further includes means for varying said time interval.

4. An apparatus, according to claim 3, wherein said means for varying said time interval is capable of determining a length of said time interval dependent on an absolute temperature level signalled by an output signal value of at least one of said temperature-dependent measuring elements.

5. An apparatus, according to claim 4, wherein said time interval is essentially inversely proportional to said absolute temperature level.

6. An apparatus, according to claim 1, wherein said apparatus further includes a comparison means for comparing said output signal value from said evaluation means with at least one preselected command value and for generating an output signal based upon said comparison.

7. An apparatus, according to claim 6, wherein said command value is representative of a maximum allowable temperature and wherein said output signal of said comparison means is transmitted to a warning system.

8. An apparatus, according to claim 6, wherein said command value is an output signal of said evaluation means for another one of said brake units and wherein said comparison means generates its output signal when said output signals of said evaluation means for said two brake units differ by more than a predetermined value.

9. An apparatus, according to claim 6, wherein said apparatus further includes at least one of a signal-processing means and a memory storage means for receiving said output signal from said comparison means.

10. An apparatus, according to claim 9, wherein said signal-processing means is a braking force control apparatus for controlling said braking force in response to said output signal from said comparison means.

11. An apparatus, according to claim 9, wherein said output signal from said comparison means is buffered in said memory storage means and wherein said comparison means extracts said buffered output signal from said memory storage means and transmits it to said signal-processing means when said brake units are activated.

12. An apparatus, according to claim 11, wherein said signal-processing means is a braking force control apparatus for controlling said braking force in response to said output signal from said comparison means.

13. An apparatus, according to claim 10, wherein:
(a) said brakable element is a vehicle wherein each of said brake units is represented by a wheel brake on one side of an axle or on one side of a group of axles respectively of said vehicle; and
(b) a braking force control apparatus is provided for each wheel brake.

14. An apparatus, according to claim 12, wherein:
(a) said brakable element is a vehicle wherein each of said brake units is represented by a wheel brake on one side of an axle or on one side of a group of axles respectively of said vehicle; and
(b) a braking force control apparatus is provided for each wheel brake.

15. An apparatus, according to clam 13, wherein said evaluation means further has stored therein a dynamic wheel radius and wherein said evaluation means by means of said dynamic wheel radius transforms said output signal value representative of a medium braking force into an output signal value representative of a medium braking torque.

16. An apparatus, according to claim 14, wherein said evaluation means further has stored therein a dynamic wheel radius and wherein said evaluation means by means of said dynamic wheel radius transforms said output signal value representative of a medium braking force into an output signal representative of a medium braking torque.

17. An apparatus, according to claim 15, wherein said vehicle further includes at least one brake activation means for arbitrarily setting said braking torque of said wheel brakes.

18. An apparatus, according to claim 16, wherein said vehicle further includes at least one brake activation means for arbitrarily setting said braking torque of said wheel brakes.

19. An apparatus, according to claim 17, wherein said at least one mass sensor is composed of at least one axle load sensor for each vehicle axle and wherein said brake activation means automatically adjusts a distribution of said braking torque between said vehicle axles to an axle load distribution.

20. An apparatus, according to claim 18, wherein said at least one mass sensor is composed of at least one axle load sensor for each vehicle axle and wherein said brake activation means automatically adjusts a distribution of said braking torques between said vehicle axles to an axle load distribution.

21. An apparatus, according to claim 10, wherein said output signal value that is representative of a measured temperature value is an average output signal value from said temperature-dependent measuring elements on each wheel brake on one side of a group of axles.

22. An apparatus, according to claim 12, wherein said output signal value that is representative of a measured temperature value is an average output signal value from said temperature-dependent measuring elements on each wheel brake on one side of a group of axles.

23. A method of at least one of measuring and regulating a braking force produced by at least one of at least two brake units, which braking force of each of said at least two brake units is transmitted to a brakable element for decelerating such brakable element, said method comprising the steps of:
(a) generating an output signal value that is representative of a measured deceleration value of said brakable element;
(b) generating an output signal value that is representative of a measured mass value of said brakable element;
(c) generating an output signal value that is representative of a measured temperature value of a brake unit;
(d) transmitting said output signal values generated in steps (a) and (b) and (c) to an evaluation means having stored therein parameters for determining a temperature development of each brake unit during activation of such brake unit;
(e) determining changes of said measured temperature value of said brake unit as they occur in a time interval at least during an activation of said brake unit;
(f) determining a medium deceleration value in said time interval; and
(g) generating and transmitting an output signal value from said evaluation means that is representative of a medium braking force produced by said at least one brake unit during said time interval as determined in said evaluation means from said changes of said temperature signal values of said brake units and from said output signal value of said mass sensor and from said medium deceleration value.

24. A method, according to claim 23, wherein said time interval is a cyclus time of said evaluation means.

25. A method, according to claim 23, wherein said method includes the additional step of varying said time interval.

26. A method, according to claim 25, wherein said step of varying said time interval includes the step of determining a length of said time interval dependent on an absolute temperature level signalled by an output signal value of at least one of said temperature-dependent measuring elements.

27. A method, according to claim 26, wherein said time interval is essentially inversely proportional to said absolute temperature level.

28. A method, according to claim 23, wherein said method includes the additional step of comparing said output signal from said evaluation means with at least one preselected command value and generating an output signal based on said comparison.

29. A method, according to claim 28, wherein said command value is representative of a maximum allowable temperature and said method includes the additional step of transmitting said output signal from said comparison means to a warning system.

* * * * *

UNITED STATES PATENT OFFICE
CERTIFICATE OF CORRECTION

PATENT NO. : 4,790,606
DATED : December 13, 1988
INVENTOR(S) : Erich Reinecke

It is certified that error appears in the above-identified patent and that said Letters Patent is hereby corrected as shown below:

Column 18, line 17, delete "torques" and insert --torque--

Signed and Sealed this

Second Day of May, 1989

Attest:

DONALD J. QUIGG

*Attesting Officer*   *Commissioner of Patents and Trademarks*